United States Patent
Malgorn et al.

(10) Patent No.: US 7,854,329 B2
(45) Date of Patent: Dec. 21, 2010

(54) HOLLOW ELEMENT FOR THE SUPPORT OF A FILTER MEDIUM INCLUDING SUPPORT MEANS IN THE FORM OF SPIRAL PORTIONS WITH A SUBSTANTIALLY CONSTANT SLOPE, AND A CORRESPONDING FILTER ASSEMBLY

(75) Inventors: Gerard Malgorn, Quimper (FR); Jean-Luc Guichaoua, Combrit (FR); Benoit Le Roux, Fouesnant (FR)

(73) Assignee: Cummins Filtration IP, Inc., Minneapolis, MN (US)

( * ) Notice: Subject to any disclaimer, the term of this patent is extended or adjusted under 35 U.S.C. 154(b) by 537 days.

(21) Appl. No.: 11/387,551

(22) Filed: Mar. 23, 2006

(65) Prior Publication Data

US 2006/0231483 A1 Oct. 19, 2006

(30) Foreign Application Priority Data

Mar. 25, 2005 (FR) .................................. 05 03006

(51) Int. Cl.
*B01D 35/00* (2006.01)
(52) U.S. Cl. .................. 210/437; 210/472; 210/483; 210/457; 55/492
(58) Field of Classification Search .............. 210/232, 210/435, 455, 457, 483, 485, 436, 437, 438, 210/497.01, 472; 55/492, DIG. 3, 505–506, 55/498
See application file for complete search history.

(56) References Cited

U.S. PATENT DOCUMENTS

| | | | | |
|---|---|---|---|---|
| 2,843,269 A | | 7/1958 | Dudinec | |
| 3,642,141 A | * | 2/1972 | Hobson, Jr. | 210/323.2 |
| 3,836,005 A | * | 9/1974 | Bauer | 210/266 |
| 4,442,004 A | * | 4/1984 | Smith et al. | 210/448 |
| 4,621,508 A | * | 11/1986 | Baxley et al. | 68/198 |
| 5,104,534 A | * | 4/1992 | Branchcomb | 210/315 |
| 5,118,421 A | * | 6/1992 | Scarano | 210/485 |
| 5,770,054 A | | 6/1998 | Ardes | |
| 6,837,993 B2 | * | 1/2005 | Clausen et al. | 210/232 |
| 7,147,110 B2 | | 12/2006 | Clausen et al. | |
| 2004/0031748 A1 | | 2/2004 | Kochert et al. | |
| 2004/0129629 A1 | * | 7/2004 | Malgorn et al. | 210/458 |
| 2004/0134171 A1 | * | 7/2004 | Scott et al. | 55/482 |
| 2004/0206690 A1 | * | 10/2004 | Amesoeder | 210/437 |

FOREIGN PATENT DOCUMENTS

| | | |
|---|---|---|
| DE | 44 30 341 A1 | 3/1995 |
| WO | WO 2005/011838 A1 | 2/2005 |

\* cited by examiner

*Primary Examiner*—Tony G Soohoo
*Assistant Examiner*—David C Mellon
(74) *Attorney, Agent, or Firm*—Hamre, Schumann, Mueller & Larson, P.C.

(57) ABSTRACT

This invention relates to a hollow element designed to cooperate with a filter cartridge of a filter assembly for fluid circulating in an engine or a hydraulic equipment, of the type with support means for a filter medium included in the said cartridge, the said support means extending from connection means and designed with recesses between them through which the said fluid is free to flow, characterized in that the said support means extend from one of the said connection means to another following a path defining a spiral portion with a substantially constant slope.

11 Claims, 2 Drawing Sheets

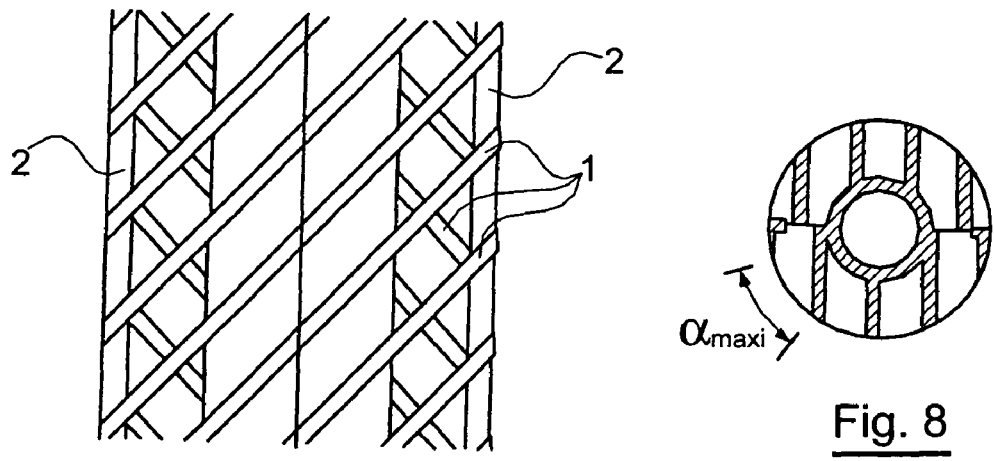
Fig. 1
Fig. 8
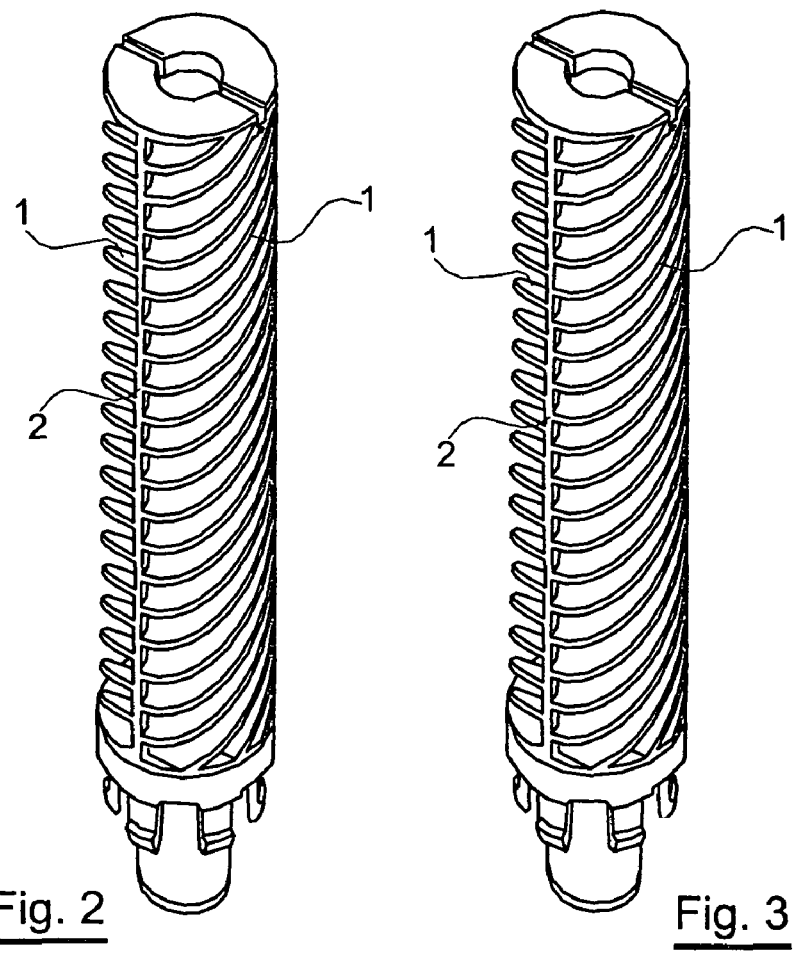
Fig. 2
Fig. 3

HOLLOW ELEMENT FOR THE SUPPORT OF A FILTER MEDIUM INCLUDING SUPPORT MEANS IN THE FORM OF SPIRAL PORTIONS WITH A SUBSTANTIALLY CONSTANT SLOPE, AND A CORRESPONDING FILTER ASSEMBLY

The present application claims priority to French Patent Application No. 0503006 filed Mar. 25, 2005, which is incorporated herein in totality by reference.

BACKGROUND

This invention relates to the domain of the design and manufacture of filter assemblies used to filter fluids circulating in motors or hydraulic equipment.

Such filter assemblies are composed of a filter body inside which a filter cartridge is arranged generally with a cylindrical shape and that includes a filter medium, for example made of paper, cardboard or felt. This filter medium is conventionally delimited by two end plates.

Two cases can arise.

Either the filter cartridges cooperate with a central tube that may or may not be fixed to the end plates (the case in which the cartridge is fixed to a tube designed to cooperate with another tube permanently installed in the filter assembly also being possible), the outside diameter of the central tube being similar to the inside diameter of the filter medium so as to limit deformations of the medium under the effect of pressure applied inside the filter assembly.

Or the cartridges are inserted in a tube in which the inside diameter is similar to the outside diameter of the filter medium, to limit deformations of the medium due to passage of the fluid from the central space of the medium towards the outside of the medium.

According to one widespread technique, filter assemblies use a support tube on which the filter cartridge is added, the tube being permanently installed in the filter assembly.

According to yet another technique, cartridge bottom end plates are extended to provide cartridge placement and support means inside the filter assembly, in this case the central tube being installed and removed together with the cartridge.

The invention is indifferently applicable to the different configurations that have just been mentioned, but is more particularly applicable to filter assemblies in which the tubes are installed permanently.

Conventionally, several considerations need to be taken into account in the design of a support tube:
- the filter medium support function, that must be provided in an optimised manner (in general, the tube must be as close as possible to the medium);
- a low "head loss" or fluid pressure loss during the passage through the tube and through the medium;
- minimum friction and/or interference with the seals of the filter cartridge during installation or replacement of the filter cartridge on the tube.

Solutions according to prior art particularly include filter assemblies as described in document DE—44 30 341 using a support tube with an irregular helical ribbed pattern.

Such a tube has the following disadvantage.

When the filter cartridge is put into place on the support tube already present in the filter assembly, the rib of the tube generates resistance to the tube being inserted as it passes inside the pre-installed seal on the bottom and top end plates of the cartridge. The same is true when the cartridge is extracted for replacement.

The seal, designed to be compressed on the tube in the operating position, tends to deform as a function of the few support points that it will have on the tube and to have chords such that the inscribed diameter in these chords is less than the diameter of the tube.

The phenomenon may be marginal when a felt seal is used, but it is more pronounced and more damaging if the seal is flexible (elastomer or other) which is tending to become more frequent.

Since filter cartridges used at the moment are expected to keep the fluid increasingly clean, it is no longer acceptable to risk damaging the seal when the cartridge is installed on the tube.

Another solution has been proposed in prior art in which the tube has two series of variable sloped helical ribs, each series extending for 180° around the tube, and the two series together forming a spiral.

However, the spiral in question is not absolutely continuous.

The ribs in each series have a variable slope which reduces to substantially zero where they join together with the ribs in the other series.

Due largely to manufacturing constraints (and particularly moulding constraints), there is often a slight offset at the point at which the ribs in one series join the ribs in the other series, which introduces a discontinuity in the spiral formed by the two series of ribs.

In some cases, this can result in the occurrence of moulding burrs near the offset area between the ribs.

These defects (offset, burrs) tend to generate unwanted friction phenomena on the seals of the filter cartridge during installation or replacement of the filter cartridge.

Furthermore, the arc along which the seal is no longer supported by the tube is always too long.

SUMMARY

The invention is intended particularly to overcome these disadvantages according to prior art.

More specifically, the purpose of the invention is to propose a filter medium support tube that combines qualities to form an optimised support for the medium and to have a low head loss, by eliminating or at least considerably reducing friction and/or interference phenomena that could damage filter cartridge seals during placement or replacement of the cartridge.

Another purpose of the invention is to limit the unsupported arc dimensions of the cartridge seal during placement of the cartridge.

Another purpose of the invention is to assure that the mouldability of the support tube is good.

Another purpose of the invention is to supply such a support tube that is easy to design and to use.

These and other purposes that will become clearer later, are achieved with the invention which is designed to produce a hollow element designed to cooperate with a filter cartridge of a filter assembly for fluid circulating in an engine or a hydraulic equipment, of the type with support means for a filter medium included in this cartridge, the said support means extending from the connection means and designed with recesses between them through which the said fluid is free to flow, characterised in that the said support means extend from one of the said connection means to another following a path defining a spiral portion with a substantially constant slope.

These support means may be made in the form of turns with a practically constant slope, which minimises friction phenomena like those mentioned on placement or replacement of the cartridge.

The reliability (in other words the reduction in the risk of leak) of the filter assembly can thus be considerably increased.

Furthermore, such a tube has good qualities related to its capability of efficiently supporting the filter medium and guaranteeing a low head loss.

Furthermore, as will be seen more clearly later, a tube according to the invention has a very good mouldability.

According to one advantageous solution, the said connection means include at least two vertical ribs.

These vertical ribs contribute to providing a homogenous support and/or a satisfactory support over the entire height of the filter medium.

They also tend to facilitate manufacturing of the tube by moulding and prevent offsets between turns as is the case with the prior art, the nature of these offsets being such that projecting parts are formed that increase friction and/or interference of the tube with cartridge seals during its placement or replacement.

In this case, the said two vertical ribs are diametrically opposite.

According to a first embodiment, the said support means along one of the said vertical ribs extend towards the prolongation of support means present on the other side of the said vertical rib.

According to a second embodiment, there is a separation 13 between the said support means along one side of the said vertical ribs and the said support means present on the other side of the said vertical rib.

The pitch between the ribs could be modified, and thus the support function could be adapted as a function of needs.

The first embodiment can reduce the unsupported arc length of the seal between two successive support means, making it less than in the second embodiment.

In the case of the second embodiment, the said support means on one side of the said vertical ribs are in contact with the said rib at substantially mid-distance between the said support means present on the other side of the said vertical rib. This second embodiment enables more consistent rib thicknesses, which is a key parameter for good moulding.

According to one preferred solution, the said support means correspond to slices of disk portions extending between the said connection means.

The rigidity of the support turns is thus made satisfactory, even when the turns are thin.

In this case, the said disk portions are preferably fixed to a central post.

According to one advantageous solution, the said slope is between about 30° and about 60° when the element is in the vertical direction, the said slope preferably being about 45°.

The resulting tube is optimised with regard to friction phenomena mentioned with reference to prior art.

Furthermore, such a slope is particularly advantageous at the junction between turns and vertical ribs, for reducing friction phenomena and also for manufacturing of the tube by moulding.

According to one advantageous solution, the pitch between the said support means is between about 5 mm and about 15 mm.

These values can vary in the case of unconventional fluid viscosities or media stiffnesses.

Thus, the unsupported arc (of the seal) is considerably shorter than in solutions according to prior art due to the structure of the support tube according to the invention.

The unsupported arc length between turns is between 13 mm and 15 mm maximum (denoted $\alpha_{max}$ in FIG. 8) whereas in prior art it was between 17 mm and 27 mm (or even more), for example for a tube diameter of the order of 40 mm.

It should be noted that this unsupported arc length may vary over the same perimeter (as shown in FIG. 8) and that these values also vary as a function of the position of the cut.

The invention also relates to a filter assembly including a hollow element that will cooperate with a filter cartridge of a filter assembly for fluid circulating in an engine or hydraulic equipment, of the type presenting support means for a filter medium included in the said cartridge, the said support means extending from the connection means and being designed with recesses between them through which the said fluid can flow, characterised in that the said support means extend from one of the connection means to another along a path defining a spiral portion with a substantially constant slope.

Other characteristics and advantages of the invention will become clearer after reading the following description of two preferred embodiments of the invention given as illustrative and non-limitative examples, and the attached drawings among which:

BRIEF DESCRIPTION OF THE FIGURES

FIG. 1 is a partial view of a cylindrical element according to the invention;

FIGS. 2 and 3 each show a perspective view of one of the two embodiments of a cylindrical element according to the invention;

FIG. 8 shows a cross-sectional view of a cylindrical element according to the invention.

DETAILED DESCRIPTION

Figure 4:
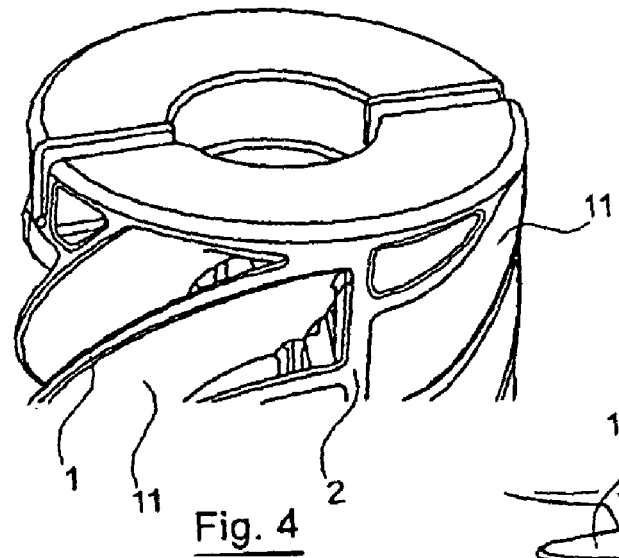
FIG. 4 shows a perspective view of the upper part of a cylindrical element according to the invention.
Figure 5:
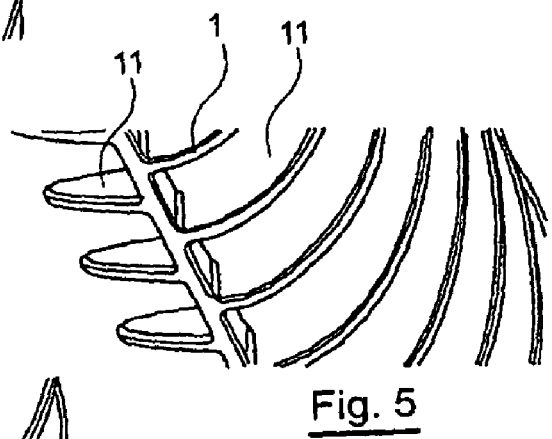
FIGS. 5 and 6 show views of an intermediate part of a cylindrical element according to the invention, showing a perspective view and a side view respectively.
Figure 6:
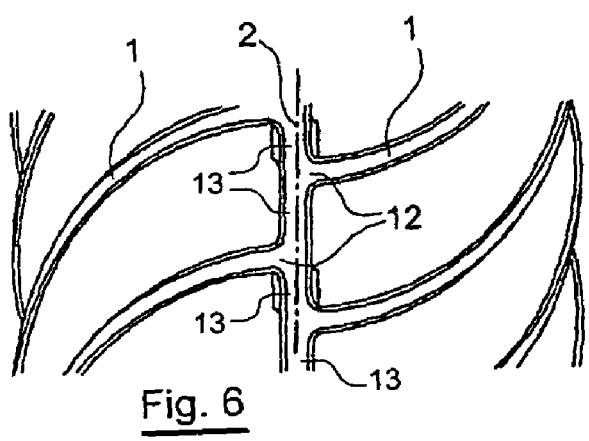

As already mentioned, the principle of the invention is based on the production of a filter medium support tube for a filter assembly to filter fluid circulating in an engine in the form of a cylindrical element comprising support means extending between connection means so as to form portions of turns with a constant or substantially constant slope.

FIG. 1 shows a front view of part of a cylindrical element comprising turns 1 (forming support means for a filter medium) connecting one connection means 2 to another with a substantially constant slope.

As illustrated, the connection means 2 are formed by two diametrically opposite vertical ribs. FIGS. 2 and 3 illustrate that the ribs 2 extend continuously from one end of the cylindrical element to the other end.

A cylindrical element according to the invention is made by moulding a plastic material (or equivalent), the turns 1 consequently forming a single piece assembly with the vertical ribs 2.

According to this embodiment, the turns 1 form an angle of about 45° with the vertical axis when the longitudinal axis of the cylindrical element itself is vertical (this slope usually being between 30° and 60° according to other possible embodiments).

FIG. 2 shows an embodiment according to which the turns 1 of one side of a vertical rib 2 are in contact with this vertical rib along the prolongation of the turns 1 on the other side of the vertical rib 2.

In this case, for illustration, the pitch between the turns 1 is also about 10 mm.

FIG. 3 shows another embodiment according to which the turns 1 on one side of a vertical rib 2 are in contact with the vertical rib at substantially mid-distance between the turns 1 on the other side of the vertical rib 2.

In this case, also for illustrative purposes, the turns 1 have a pitch of about 10 mm.

It should be noted that as shown in FIGS. 2 and 3, the pitch between turns 1 is substantially constant from one end of the cylindrical element to the other. However, it would be possible that this pitch could vary to modulate the support function over the height of the cylindrical element.

With reference to FIGS. 4 to 7, the support turns 1 are composed of slices of disk portions 11 extending between the vertical ribs 2. In addition, as shown in FIGS. 1-5, 7 and 8, the disk portions 11 and the ribs 2 have outer edges, and the outer edges of the disk portions 11 do not project beyond the outer edges of the ribs 2.

These disk portions 11 form plates that make the turns very stiff in resisting radial constraints applied to them due to the fluid pressure applied to them through the filter medium. As shown in FIG. 4, the disk portions 11 have a radial dimension that is greater than a thickness dimension of the disk portions 11 in the axial (i.e. longitudinal) direction of the cylindrical element.

Figure 7:
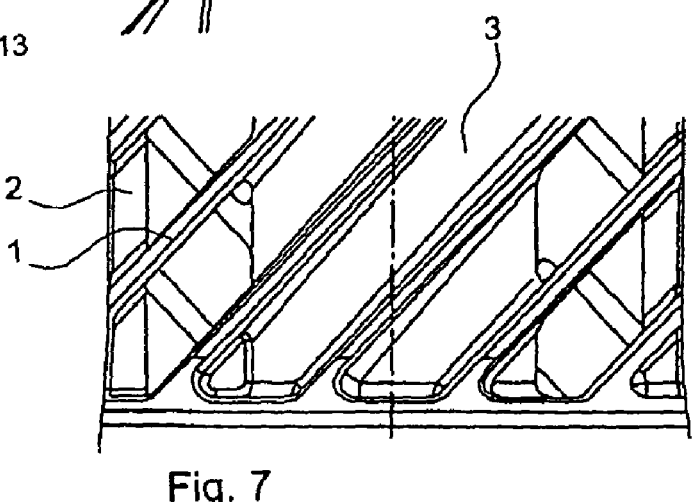
FIG. 7 shows a perspective view of the lower part of the cylindrical element according to the invention.

The fact that the disk portions 11 are fixed to a central post 3 (FIG. 7) also helps to resist these forces. As shown in FIGS. 1 and 7, the ribs 2 are not directly attached to the central post 3.

Furthermore, high mechanical strength of the junction between the turns 1 and the vertical ribs 2 is obtained due to the presence of splays 12 at the end of the turns 1. The junction between the turns 1 and the ribs is thus wider compared with the thickness of the turns 1.

For guidance, the thickness of the turns is about 1.5 mm to 2 mm.

The invention claimed is:

1. A hollow element designed to cooperate with a filter cartridge of a filter assembly for fluid circulating in an engine or hydraulic equipment, the hollow element comprising supports for a filter medium included in the cartridge, said supports extending from junctions with connectors and designed with recesses between them through which the fluid is free to flow, the connectors extend continuously from one end of the hollow element to a second end, and splays at ends of the supports at the junctions with the connectors so that the junctions are wider than a thickness of the supports, wherein said supports extend from one of said connectors to another following a path defining a spiral portion with a substantially constant slope, said connectors comprise at least two vertical ribs, there is a separation between said supports along one side of said vertical ribs and said supports present on the other side of said vertical rib, and said supports correspond to slices of disk portions extending between said connectors, the supports and the ribs have outer edges and the outer edges of the supports do not project beyond the outer edges of the ribs, and the disk portions have a radial dimension that is greater than a thickness dimension in an axial direction, said hollow element further comprising a central post, said disk portions are fixed to the central post, and the ribs are not directly attached to the central post, the central post, the disk portions and the ribs are a single piece assembly formed from a plastic material.

2. The hollow element according to claim 1, wherein said two vertical ribs are diametrically opposite.

3. The hollow element according to claim 1, wherein said supports along one side of said vertical ribs are in contact with said rib at substantially mid-distance between said supports present on the other side of said vertical rib.

4. The hollow element according to claim 1, wherein said slope is between 30° and 60° when the element is in the vertical direction.

5. The hollow element according to claim 1, wherein said slope is 45° when the element is in the vertical direction.

6. The hollow element according to claim 1, wherein the supports have a pitch therebetween that is between 5 mm and 15 mm.

7. A filter assembly comprising a hollow element designed to cooperate with a filter cartridge of a filter assembly for fluid circulating in an engine or hydraulic equipment, the hollow element including supports for a filter medium included in said cartridge, said supports extending from junctions with connectors and designed with recesses between them through which said fluid is free to flow, the connectors extend continuously from one end of the hollow element to a second end, and splays at ends of the supports at the junctions with the connectors so that the junctions are wider than a thickness of the supports, said supports extend from one of said connectors to another following a path defining a spiral portion with a substantially constant slope; wherein said connectors comprise at least two vertical ribs, there is a separation between said supports along one side of said vertical ribs and said supports present on the other side of said vertical rib, and said supports correspond to slices of disk portions extending between said connectors, the supports and the ribs have outer edges and the outer edges of the supports do not project beyond the outer edges of the ribs, and the disk portions have a radial dimension that is greater than a thickness dimension in an axial direction, said hollow element further including a central post, said disk portions are fixed to the central post, and the ribs are not directly attached to the central post; and the central post, the disk portions and the ribs are a single piece assembly formed from a plastic material.

8. The hollow element according to claim 3, wherein said slope is between 30° and 60° when the element is in the vertical direction.

9. The hollow element according to claim 2, wherein said slope is between 30° and 60° when the element is in the vertical direction.

10. The hollow element according to claim 1, wherein said slope is between 30° and 60° when the element is in the vertical direction.

11. The filter assembly according to claim 7, wherein said slope is between 30° and 60° when the element is in the vertical direction.

* * * * *